United States Patent Office 2,831,776
Patented Apr. 22, 1958

2,831,776

COMBINED WOOD FILLER AND GLAZIER PUTTY

Gustave J. Soderberg, Babylon, N. Y.

No Drawing. Application August 23, 1955
Serial No. 530,190

4 Claims. (Cl. 106—109)

This invention relates to a combined wood filler and glazier putty capable of filling cracks and recesses in wood for constructional and ornamental purposes.

In my co-pending patent application Ser. No. 474,514, filed December 10, 1954, now abandoned, I have described a combined wood filler and glazier putty which consists of a mixture of wood flour and a paste-like setting substance, such as a wood putty.

An object of the present invention is to improve the combined wood filler and glazier putty described in said patent application through the provision of a substance which will have better resistance to shrinkage and drying, as well as to the effects of heat, cold, rain, snow and ice.

Other objects of the present invention will become apparent in the course of the following specification.

The objects of the present invention may be realized through the provision of a combined wood filler and glazier putty which consists of a mixture of wood flour, gypsum plaster and one or more setting substances.

According to a preferred embodiment of the present invention, a mixture of solids, consisting of gypsum plaster, wood flour, powdered rosin, and litharge, is used in admixture with a mixture of liquids consisting of shellac, linseed oil, alcohol.

The operative percentages of the above ingredients are 20 to 60 parts gypsum plaster, 5 to 10 parts wood flour, 5 to 20 parts powdered rosin, 1 to 2 parts litharge; also 5 to 25 parts shellac, 5 to 20 parts linseed oil, 2 to 10 parts alcohol, and 5 to 20 parts commercial rosin, 5 to 20 parts of hide glue.

According to modifications of the inventive idea, gypsum plaster may be replaced by plaster of Paris or by whiting.

The following specific examples are given solely by way of exemplification and not by way of limitation:

Example 1

40 parts of gypsum plaster and 10 parts wood flour are thoroughly cold mixed with 20 parts shellac, 15 parts rosin which is the residue of the distillation of terpentine, 10 parts linseed oil and 5 parts pure alcohol.

Example 2

55 parts of gypsum plaster and 5 parts wood flour are thoroughly cold mixed with 15 parts shellac, 15 parts rosin, 5 parts linseed oil and 5 parts alcohol.

Example 3

40 parts of gypsum plaster and 5 parts wood flour are thoroughly cold mixed with 20 parts of hide glue, 20 parts rosin and 15 parts linseed oil.

Example 4

50 parts of gypsum plaster and 10 parts wood flour are thoroughly cold mixed with 15 parts shellac, 15 parts rosin, 5 parts glue and 5 parts linseed oil.

Example 5

30 parts of gypsum plaster and 5 parts wood flour are thoroughly cold mixed with 20 parts of asbestos, 10 parts plaster, 15 parts hide glue, 10 parts shellac, 5 parts linseed oil and 5 parts alcohol.

Example 6

51 parts of gypsum plaster and 10 parts wood flour are thoroughly cold mixed with 5 parts powdered rosin, and 2 parts litharge, and 20 parts shellac, 10 parts linseed oil, 2 parts alcohol, are added to the mixture.

Example 7

The gypsum plaster of Example 6 is replaced by plaster of Paris, otherwise the ingredients are the same.

Example 8

The gypsum plaster of Example 6 is replaced by whiting, otherwise the ingredients are the same.

The combined wood filler and glazier putty of the present invention is made by mixing the above ingredients. It may be made of different colors by the addition of any suitable pigments and may be applied with an ordinary putty knife to fill crevices, cracks and recesses. After all the recesses have been filled, the mixture is allowed to dry for about forty-eight hours. It will form a hard substance and will not shrink. Then it may be sandpapered to form a smooth surface.

Practical experience has shown that this procedure results in a most effective woodwork which can be used for a variety of ornamental purposes as well as for parquet flooring and other uses.

The combined filler and glazier putty of the present invention may also be used effectively in apartment houses, homes and factories as a filler for rotted and dried out sills and window frames prior to painting or other work, as well as glazier putty for securing window panes.

What is claimed is:

1. A combined wood filler and glazier putty, consisting essentially of a cold mixture of from 20 to 40 parts of gypsum plaster, 5 to 10 parts wood flour, from 5 to 10 parts rosin, and from 5 to 10 parts linseed oil, 20 to 25 parts shellac and 1 to 3 parts alcohol.

2. A combined wood filler and glazier putty, consisting essentially of a cold mixture of from 30 to 40 parts of gypsum plaster, 5 to 10 parts wood flour, from 5 to 20 parts rosin, from 5 to 20 parts linseed oil and from 5 to 20 parts shellac.

3. A combined wood filler and glazier putty, consisting essentially of a cold mixture of gypsum plaster, wood flour, powdered rosin, litharge, shellac, linseed oil and alcohol.

4. A combined wood filler and glazier putty, consisting essentially of a cold mixture of from 40 to 60 parts of gypsum plaster, 5 to 10 parts of wood flour, 5 to 10 parts powdered rosin, 2 to 5 parts of litharge, 10 to 20 parts shellac, 5 to 10 parts linseed oil, and 1 to 3 parts alcohol.

References Cited in the file of this patent

UNITED STATES PATENTS

| | | |
|---|---|---|
| 136,722 | Hague | Mar. 11, 1873 |
| 140,668 | Auguste | July 8, 1873 |
| 362,851 | Mosher | May 10, 1887 |
| 529,876 | Pattigler | Nov. 27, 1894 |
| 561,938 | Goldmann | June 9, 1896 |
| 878,912 | Timofeeff | Feb. 11, 1908 |
| 2,025,369 | Batelja | Dec. 24, 1953 |